United States Patent Office 3,312,279
Patented Apr. 4, 1967

3,312,279
METHOD OF WATER FLOODING BY USING PHOSPHORYLATED MANNAN
Donald O. Hitzman, Bartlesville, Okla., assignor to Phillips Petroleum Company, a corporation of Delaware
No Drawing. Filed Nov. 23, 1959, Ser. No. 854,529
5 Claims. (Cl. 166—9)

This invention relates to a method of water flooding. In one of its aspects, the invention relates to beneficiating oil-bearing strata by a water-flooding method which comprises adding phosphorylated mannan, an exocellular polysaccharide which is synthesized from glucose by a species of yeast, *Hansenula holstii*, to water which is then pumped into an oil-bearing stratum.

In another of its aspects, the invention relates to the injection into flood water already present in a formation of at least one of the above-identified materials.

Water flooding for use in secondary recovery from oil-bearing formation, thus to increase the total or overall oil yield of the formation, is old and well known.

It has now occurred to me that phosphorylated mannan, for example, as described in United States Department of Agriculture, Agricultural Research Service, Northern Utilization Research and Development Division, Peoria, Illinois, bulletin CA-N-7, October 1958, will be useful in secondary recovery of oil from oil-bearing formations.

It is an object of this invention to provide a method of water flooding. It is another object of this invention to provide a water of increased viscosity for use in water-flooding of oil-bearing formations to increase the total or overall yield of oil which can be recovered therefrom.

Other aspects, objects and the several advantages of this invention are apparent from this disclosure and the claims.

According to this invention, phosphorylated mannan is added to water or other fluids used for flooding oil-bearing formations. Also, according to the invention, the polysaccharide can be injected into a fresh water for flooding purposes.

Also, according to the invention, there can be used borax and/or potassium chloride together with the polysaccharide.

In a now preferred embodiment of the invention, 1-2 percent phosphorylated mannan, with some borax or potassium chloride, is added to water to provide a water-flooding fluid which is then pumped by usual methods into the oil-bearing formation to effect secondary oil recovery.

The following table shows by comparison the advantage of my invention over more commonly known viscosifiers.

| At 25° C. solution in water | | Viscosity, cp. |
|---|---|---|
| Concentration, Percent | Material | |
| 1 | Phosphorylated mannan | 2,300 |
| 20 | Sucrose | 1.704 |
| 10 | Crude sugar | 1.060 |
| 10 | Glycerine | 1.153 |
| .1 | Triton (detergent) | (1) |
| .4 | Polyox WSR301 | 21.0 |

1 Same as $H_2O$.

At a 1 percent concentration, the table shows a viscosity of 2300 cp. (water). The viscosity of a 2 percent solution in water (2400 cp.) is increased 3.7 fold to 8880 by addition of a .4 percent borax. When measured in the same way, a 1 percent solution in water of ammonium alginate and galacto-mannan gives values of approximately only 3500 cps.

Since the phosphorylated mannan is very reactive, detergents can be added to the flood water or fluid, if desired.

The material used according to this invention can be injected into the flood waters already present in the formation, or miscible fluid floods can be made at the surface by fermentation and then injected.

In view of the activity of the phosphorylated mannan, concentrations which are quite low can be employed. At present, 1-2 percent of the phosphorylated mannan, together with a percent or less of borax, say, about .4 to .6 percent borax, is a preferred composition for use according to the invention. This addition of borax greatly increases the viscosity. Thus, the addition of .4 percent borax to a 2 percent solution in water of the phosphorylated mannan, which already has a viscosity of 2400 cp. is increased 3.7 fold, as above noted. In lieu of thus using borax, use can be made of borax, or, for that matter, potassium chloride or other inorganic salts which are in brines, which are available or which are in the formation, thus further reducing costs.

Polyox WSR301, above-mentioned, is a trade name for a polymerized ethylene oxide grouping containing detergent material.

The following are data obtained with Brookfield viscometer at 30 r.p.m. with a No. 3 spindle.

| Polysaccharide conc. | Cp. in oil with brine | Cp. in fresh water | Cp. in fresh water with .5% Na borate | Cp. in fresh water with .5% Na borate +.1% KCl |
|---|---|---|---|---|
| 0 | 0 | 0 | 0 | 0 |
| .5% | 40 | 600 | 40 | 40 |
| 1.0% | 80 | 1,800 | 80 | 80 |
| 1.5% | 80 | 2,080 | 240 | 400 |
| 2.0% | | 2,000 | 10,400 | 15,000 |
| 3.0% | | 1,800 | 14,000 | |

Since the viscosity of the solution used according to the invention need only to exceed the viscosity of the oil in the formation by a small amount, the viscosity of the solution of the invention does not have to be of a high order. Thus, depending on the oil, since most oils test below 10 cp., 25 cp. viscosity should readily match almost all oils. Flood water with viscosifier added would need be only one or two cp. above the oil vicosity. The data herein indicate a very low concentration to be more than adequate to give the needed viscosity for secondary oil recovery operation.

It apepars that a compound used according to the invention is much more effective in fresh water than are most viscosifiers with the added advantage that above a certain concentration, the salts increase their viscosity, while with other materials, this is not true since added salts will decrease their viscosity.

Reasonable variation and modification are possible within the scope of the foregoing disclosure and the appended claims to the invention the essence of which is that phosphorylated mannan has been added to water in water-flooding oil-bearing formations to increase oil recovered therefrom by secondary recovery methods.

I claim:

1. A method of water-flooding an oil-bearing formation with a water of increased viscosity which comprises adding an effective amount of phosphorylated mannan which is an exocellular polysaccharide which is synthesized from glucose by a species of yeast, *Hansenula holstii*, to the water in a water-flooding operation to increase appreciably the viscosity of said water.

2. A secondary oil recovery method of water flooding of a formation in which phosphorylated mannan which is an exocellular polysaccharide which is synthesized from glucose by a species of yeast, *Hansenula holstii*, is caused to be present by injecting the same into an oil-bearing formation being conditioned for secondary oil recovery in an amount effective to increase appreciably the viscosity of the water in said formation.

3. A method of water-flooding an oil-bearing formation which comprises injecting into said formation approximately 1-2 percent of phosphorylated mannan which is an exocellular polysaccharide which is synthesized from glucose by a species of yeast, *Hansenula holstii*, in water.

4. A method of secondary recovery of oil from an oil-bearing formation which comprises injecting into said formation phosphorylated mannan which is an exocellular polysaccharide which is synthesized from glucose by a species of yeast, *Hansenula holstii*, in an amount sufficient to increase the viscosity of water in said formation.

5. A method of treating an oil-bearing formation which comprises injecting thereinto a water solution of phosphorylated mannan which is an exocellular polysaccharide which is synthesized from glucose by a species of yeast, *Hansenula holstii*, and an inorganic salt selected from the group consisting of borax and potassium chloride in an amount sufficient to increase the viscosity of water in said formation.

References Cited by the Examiner

UNITED STATES PATENTS

| | | | |
|---|---|---|---|
| 2,341,500 | 2/1944 | Detling | 252—8.55 |
| 2,731,414 | 1/1956 | Binder et al. | 252—8.55 |
| 2,771,138 | 11/1956 | Beeson | 252—8.55 |
| 2,908,597 | 10/1959 | Owen | 252—8.5 |
| 2,961,378 | 11/1960 | Benedict et al. | 195—31 |
| 3,053,765 | 9/1962 | Sparks | 252—8.55 |

OTHER REFERENCES

U.S. Department of Agriculture, Agricultural Research Service, Northern Utilization Research and Development Division, Peoria, Illinois, bulletins CA–N–7 and CA–N–9, October 1958 and September 1959.

CHARLES E. O'CONNELL, *Primary Examiner.*

JULUIS GREENWALD, JOSEPH R. LIBERMAN,
*Examiners.*

H. B. GUYNN, S. J. NOVOSAD, *Assistant Examiners.*